United States Patent [19]
Yamada et al.

[11] Patent Number: 5,548,350
[45] Date of Patent: Aug. 20, 1996

[54] PROJECTION TYPE TELEVISON SCREEN MOUNTING STRUCTURE INCLUDING AN ELASTIC MATERIAL FOR HOLDING A SCREEN

[75] Inventors: Tadayoshi Yamada, Osaka; Masahiro Tozuka; Katumi Goto, both of Takatsuki; Tuyoshi Simatani, Kyoto; Yoshinobu Maeda, Katano, all of Japan

[73] Assignee: Matsushita Electric Industrial Co., Ltd., Osaka, Japan

[21] Appl. No.: 236,347

[22] Filed: May 2, 1994

[30] Foreign Application Priority Data

May 7, 1993 [JP] Japan ................................ 5-106569

[51] Int. Cl.$^6$ .............................. G03B 21/10; H04N 5/74
[52] U.S. Cl. ................ 348/839; 348/836; 348/789; 359/443; 359/460; 353/74
[58] Field of Search ........................ 359/443, 448, 359/449, 450, 453, 454, 456, 459, 460; 348/836, 839, 842, 744, 789; 312/7.2, 10.1; 353/47, 72, 74, 77, 79

[56] References Cited

U.S. PATENT DOCUMENTS 5,206,760 4/1993 Nakashima et al. .

5,363,149 11/1994 Furuno et al. ............. 359/456 X

FOREIGN PATENT DOCUMENTS

0523427A1 1/1993 European Pat. Off. .
4-369629 12/1992 Japan .

*Primary Examiner*—Victor R. Kostak
*Assistant Examiner*—Nathan J. Flynn
*Attorney, Agent, or Firm*—Ratner & Prestia

[57] ABSTRACT

A projection type television receiver in which the screen is maintained on the framework despite temperature changes or external force application, and also a large screen video display apparatus which displays video images with minimal loss of picture area, characterized by easy installation or removal of the screen holding framework, and which is excellent in maintainability. A plurality of a projection type television receivers are arranged in multiple rows and lines for the purpose of displaying a large screen video image. Each projection type television receiver comprises a permeable screen with a screening effect, a framework for holding the permeable screen, an elastic member one surface of which is fixed to the peripheral end part of the permeable screen, and the other surface of which is fixed to the framework's holding part of the permeable screen, and which is readily deformable according to applied external forces, and a cabinet having its opening installed within the framework.

8 Claims, 7 Drawing Sheets

PROJECTION TYPE TELEVISON SCREEN MOUNTING STRUCTURE INCLUDING AN ELASTIC MATERIAL FOR HOLDING A SCREEN

BACKGROUND OF THE INVENTION

The present invention relates to a back projection type television receiver wherein video images are projected on a permeable screen, and to its application in a large screen video display apparatus. More specifically, the present invention relates to a structure for holding such a screen.

Figure 8:
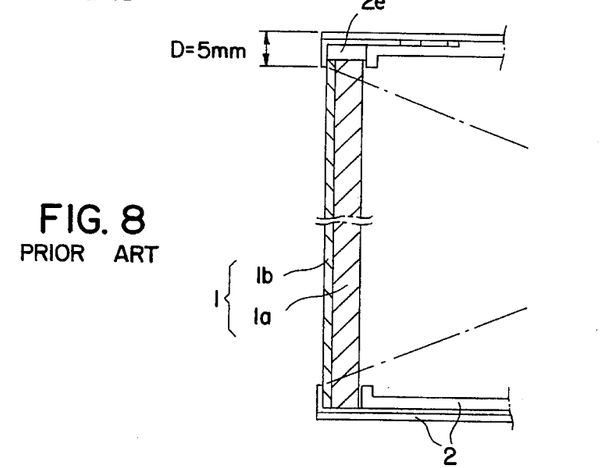
FIG. 8 is a cross-sectional view to show schematically main structures of a screen and framework of a prior art projection type television receiver.
Figure 9:
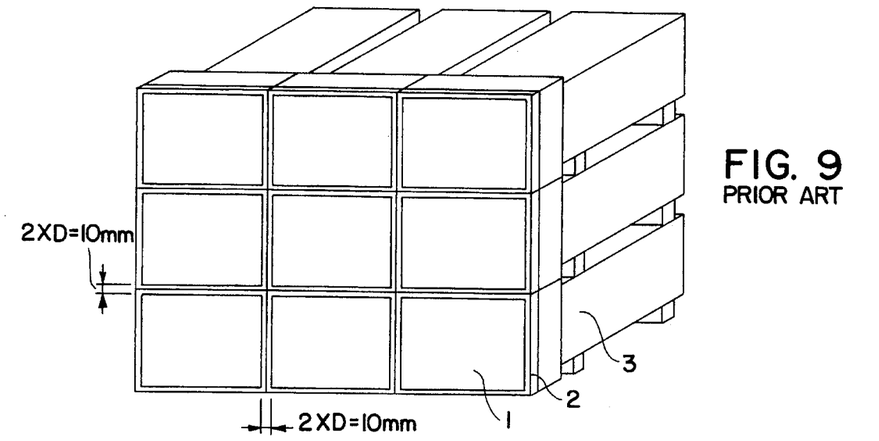
FIG. 9 shows the appearance of a large screen video display apparatus having a plurality of a prior art projection type television receiver arranged in a matrix formation.

An example of a prior art holding structure for a permeable screen used in a back projection type television receiver is shown in FIG. 8 and FIG. 9. FIG. 8 shows schematically a cross-sectional view of a prior art structure for holding a permeable screen. In general, a projection type television receiver is used to build a large screen video display apparatus with its large screen measuring, for example, 700 to 900 mm in width and about 500 to 700 mm in height.

In FIG. 8, the permeable screen 1 is formed of a Fresnel lens sheet 1a laminated with a lenticular lens sheet 1b. The screen 1 is held by a recessed slot 2e formed on the inner side of the periphery of a framework 2 with the peripheral end surfaces of screen 1 fixed in said slot 2e by insertion. A plastic material like acrylic resin is generally used as the material for the Fresnel lens sheet 1a and lenticular lens sheet 1b.

Because a large screen is held by the framework 2, it is desirable for the material used in the framework 2 to have strong mechanical strength, and a metallic material is usually used to build the framework 2. Plastic materials and metallic materials as well expand or shrink according to temperature changes. Particularly, the thermal expansion coefficient of plastic materials is much larger than that of metallic materials. Therefore, when a plastic material having such a relatively large thermal expansion coefficient is used as the screen material, the outline dimensions of the screen are changed greatly by expansion or contraction according to the changes in ambient temperature or humidity. For example, in case of a screen measuring 900 mm in width, its width changes about 3 mm in total over the temperature changes of −10° to +40° C. In contrast, the dimensional changes of a framework made of a metallic material due to thermal expansion or contraction total about 1 mm over the temperature changes of −10° to +40° C. Accordingly, on account of a big difference existing between the framework 2 and screen 1 in expansion or contraction, it has not been possible to realize a structure wherein the screen 1 and framework 2 are coupled together with a projection type television receiver incorporating a large picture screen. As a result, the screen 1 has been liable to fall off the framework 2, thereby causing a problem.

As a measure to prevent the screen from falling off due to expansion or contraction, a structure wherein the dimension of the holding part of the framework 2 is made much larger than that of the screen 1 has been proposed. More specifically, the screen 1 is better retained by increasing the depth of the slot 2e formed in the framework 2. In this case, the width of the framework 2 looking from the front, e.g. the edge width D may be about 5 mm in length. This depth is accounted for by the depth of the slot and the thickness of the material plate of the framework.

FIG. 9 shows a perspective view of a prior art large screen video display apparatus wherein a plurality of the foregoing permeable screen type television receivers are arranged in a matrix formation composed of multiple lines and rows. In FIG. 9, item 1 is the screen and item 2 is the framework. The framework 2 holding the screen 1 is coupled with a cabinet, wherein circuit components and optical components are contained, so as to cover the opening thereof completing a permeable screen type television receiver. A large screen video display apparatus for displaying one video image is completed by placing three of the foregoing television receivers in the horizontal direction next to one another and stacking the receivers in three stages with one over the other.

With the prior art large screen video display apparatus as shown in FIG. 9, the dimension of the total edge width including the neighboring edges is as much as about 10 mm. The edge width portions exist in the displayed video image as rather thick grid-like lines where no video images are carried. As a result, video images are missing from the picture frames. This creates a problem for viewers in that the displayed video images are hard to see.

SUMMARY OF THE INVENTION

A permeable screen type television receiver of the present invention comprises:

a permeable screen having a screening effect, a framework for holding the permeable screen, an elastic member which is disposed by sticking between the permeable screen and a holding member of the framework and is readily deformed according to applied external force, and a cabinet with an opening which is fitted with the framework.

According to the foregoing structure, because a screen is fixed on a framework through an elastic member, prevention of the screen from falling off the framework and elimination of strain exerted on the screen can be expected. More specifically, when the screen expands due to an increase in temperature or humidity, the elastic member will be deformed to cope with the expansion and distortion of the screen is prevented from taking place. When the screen shrinks due to a reduction in temperature, the screen is prevented from falling from the framework because the screen is attached to the framework and also the elastic member is deformed to cope with the contraction of the framework. Further, even when an external force is applied to the screen, the trouble of the screen falling from the framework is eliminated because the screen is fixed to the framework. Thus, a permeable screen type television receiver of high reliability can be realized.

Another structure of the permeable screen type television receiver of the present invention comprises:

a permeable screen of a rectangular shape having a screening effect, a rectangular framework, in which two neighboring side members located at three corners are joined respectively by means of a deformable L-shaped corner joint and the two neighboring side members located at the remaining one corner are joined by means of a non-deformable L-shaped joint, and which holds the end portions of the periphery of the screen by cementing inside thereof, an elastic member which is disposed by cementing between the permeable screen and a holding member of the framework and is readily deformed according to applied external force, and a cabinet with an opening which is fitted with said framework.

According to the foregoing structure, the elastic member will be deformed according to the magnitude of expansion and contraction of the screen when the screen is expanded or contracted rather greatly due to a fairly large change in temperature or humidity. At the same time, the deformable L-shaped corner joint will be deformed according to the expansion or contraction of the screen. As a result, troubles such as distortion and breakage of the screen will be eliminated.

A large screen video display apparatus of the present invention has a structure wherein a plurality of projection type television receiver comprising:

a permeable screen having a screening effect, a framework for holding the permeable screen, an elastic member to change its shape readily according to applied external force, one side of which is stuck to the end portions of the periphery of said permeable screen and the other side of which is stuck to a holding member of said framework, and a cabinet with an opening which is fitted with the framework. Several cabinets are assembled to form one large video display by an arrangement in a matrix formation composed of multiple lines and rows.

According to the foregoing structure, there is no need for extra gaps disposed around the periphery of the screen with the large screen display apparatus having a plurality of the permeable screen type television receiver arranged in a matrix formation composed of multiple lines and rows because the screen and the framework are attached to each other through an elastic member which is readily deformed according to applied external force. As a result, the edge width of the joining portions between screens can be made extremely narrow, thereby realizing excellent video images without losing portions of the images.

Another feature of the present invention is a structure employed with the foregoing multi-screen type large screen video display apparatus wherein a lock lever rotatable towards the side of viewers of the display is installed in the framework, a lock pin is disposed in a hollow formed on the end surface of the opening of said cabinet and said lock pin is engaged with the lock lever for fastening said cabinet to said framework, and further the foregoing locking condition is released by turning the lock lever towards the side of viewers.

According to the foregoing structure employed in a large screen video display apparatus with multiple screens arranged in a matrix formation, it is possible to install or remove a framework for holing a screen located near the center of the matrix, so that maintenance can be readily performed.

BRIEF DESCRIPTION OF THE DRAWINGS

FIG. 3a is a cross-sectional view to show schematically the main cross-sectional part of the projection type television receiver of FIG. 1, cut along the line 3a—3a.

FIG. 5b is an expanded perspective view of the main part of the framework illustrated in FIG. 5a.

FIG. 5c is an enlarged detail to illustrate schematically holding structures of the framework and screen shown in FIG. 5a.

FIG. 5d is an enlarged detail to illustrate schematically in accordance with an exemplary embodiment of the framework shown in FIG. 5a.

DETAILED DESCRIPTION OF THE INVENTION

Specific exemplary embodiments of a projection type television receiver of the present invention will be explained in detail with the help of FIG. 1 to FIG. 7.

EXAMPLE 1

Figure 1:
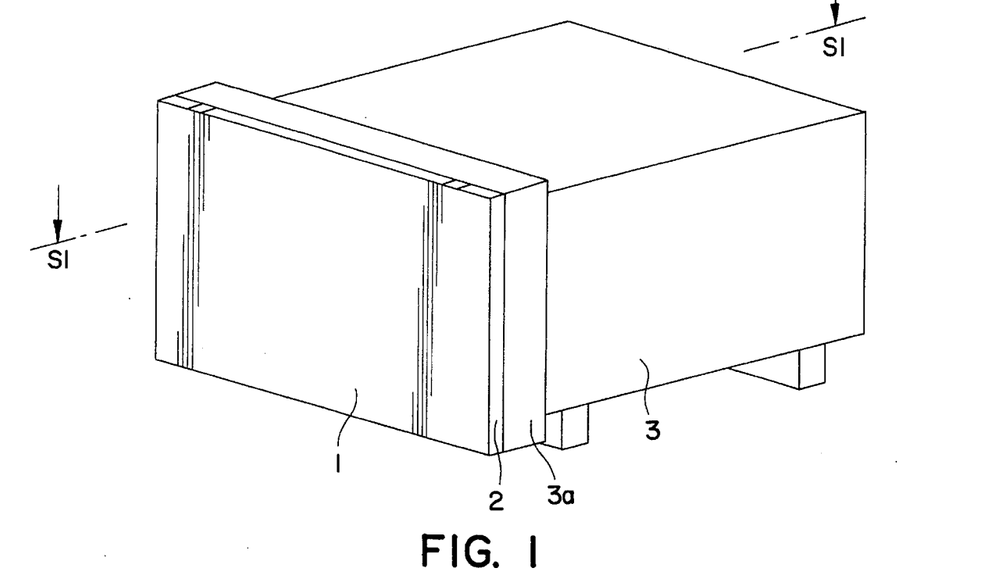
FIG. 1 is a perspective view to schematically show the structure of a projection type television receiver in accordance with an exemplary embodiment of the present invention.

FIG. 1 is a perspective view to show schematically structures of a projection type television receiver in accordance with an exemplary embodiment of the present invention.

In FIG. 1, a permeable screen 1 having a screening effect is held with the end portion of its periphery fixed to a framework 2.

A cabinet 3 contains specified components such as circuit components, optical components or the like inside thereof. The framework 2 holding the screen 1 is installed on the opening 3a of said cabinet 3.

Each of screen 1, framework 2 and cabinet 3 are rectangularly shaped like a quadrangle.

There are no particular restrictions imposed on the dimensions of the screen 1, but its typical dimensions are 700 to 900 mm in width and 500 to 700 mm in height, for example.

Figure 2:
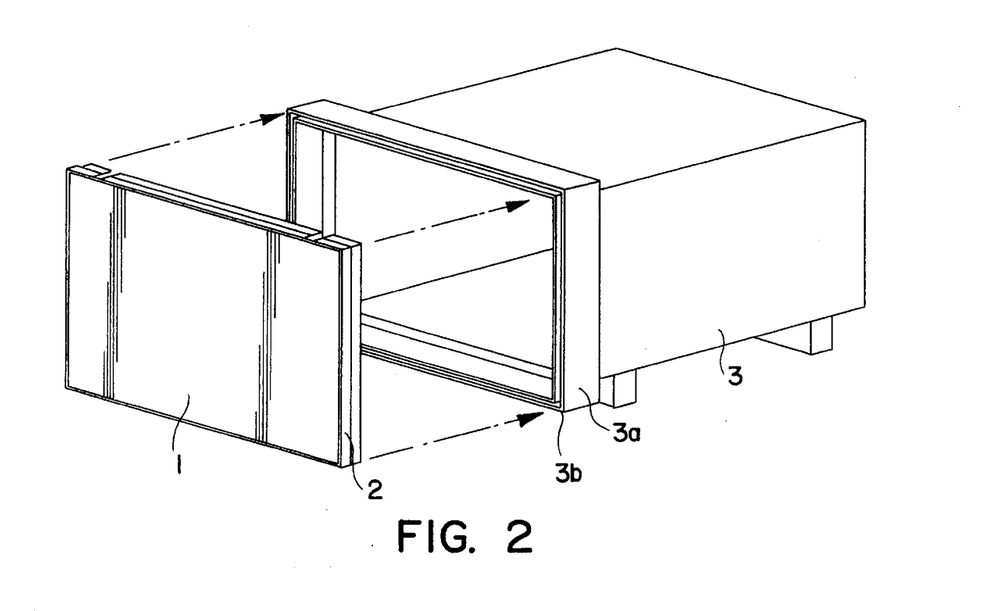
FIG. 2 is a perspective view to illustrate the steps of mounting a screen for the projection type television receiver of FIG. 1.

FIG. 2 is a perspective view to illustrate the steps of mounting the framework 2 and cabinet 3 shown in FIG. 1.

In FIG. 2, a recessed slot 3b is formed on the end surface of the cabinet's opening 3a corresponding to the configuration of the framework 2, and the edge of one side of the framework 2 is inserted in slot 3b for putting together the cabinet 3 and the framework 2.

In an exemplary embodiment of the present invention, a plastic material is used as the material of the screen. Furthermore, in an exemplary embodiment of the present invention, a metallic material such as iron, stainless steel, aluminum, or reinforced plastic materials having great mechanical strength may be used.

Figure 3A:
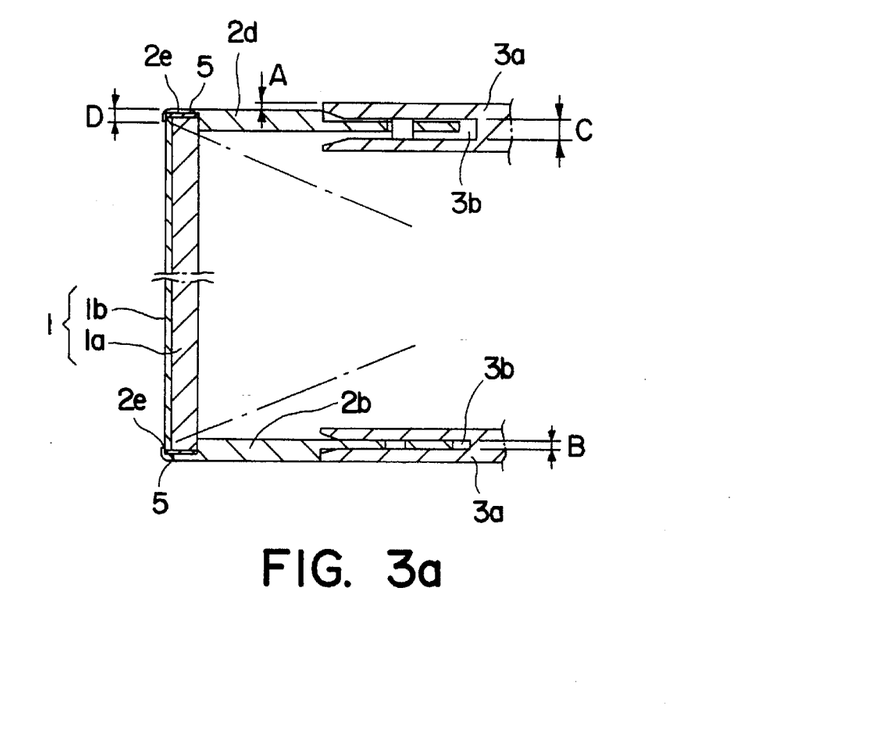
Figure 3B:
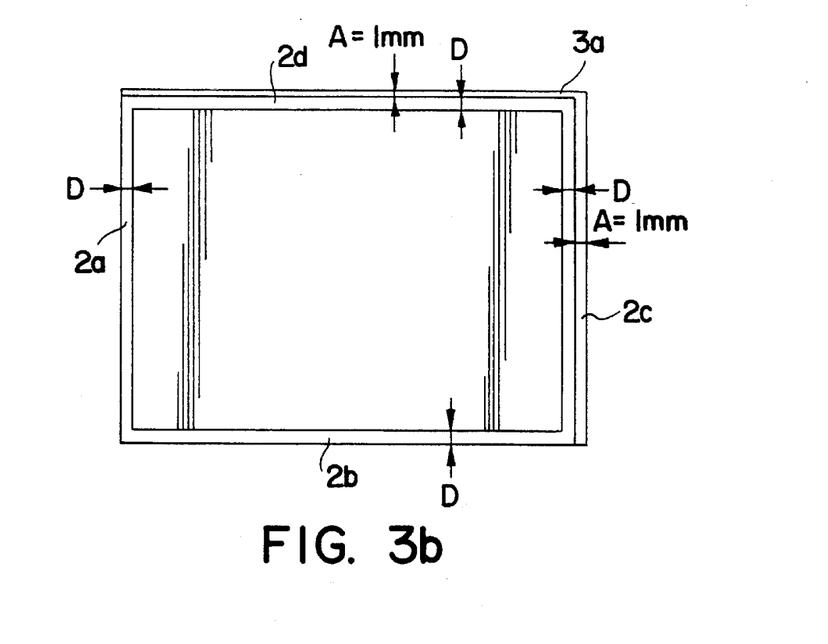
FIG. 3b is a front view of the projection type television receiver of FIG. 1.

FIG. 3a is a cross-sectional view to show schematically a main part of the cross-section of the projection type television receiver of FIG. 1, cut along the line 3a—3a. FIG. 3b is a front view of the projection type television receiver of FIG. 1, viewed from the screen side.

As shown in FIG. 3a, the screen 1 is formed of a lamination of a Fresnel lens sheet 1a and a lenticular lens sheet 1b. The role of the Fresnel lens sheet 1a is to have the light from a Braun tube converged, and that of the lenticular lens sheet 1b is to have the horizontal visual field angle widened.

In an exemplary embodiment of the present invention, plastic material may be used for Fresnel lens sheet 1a and lenticular lens sheet 1b.

Acrylic resin, polycarbonate resin, polyester resin, fluorocarbon resin or the like are used as the plastic materials, for example.

In an exemplary embodiment of the present invention, the thickness of the Fresnel lens sheet and the lenticular lens sheet may range from 2 to 3 mm and 0.5 to 1.5 mm, respectively.

In addition, it is possible with the present example to have a protective panel installed on the front as part of the screen 1.

In FIG. 3a and FIG. 3b, the framework 2 is rectangular like a quadrangle formed of four side members, e.g. a left side member 2a, bottom side member 2b, right side member 2c and upper side member 2d.

A recessed slot 2e is formed on the inner surface of each respective side member of said framework 2, and an elastic member 5 is placed in slot 2e.

When a metallic material such as iron is used as the material of the framework 2, a metal plate of about 0.2 mm thick is employed to form the framework 2.

The slot 2e is provided with a lining of another metal plate or a reinforced plastic plate inside thereof. The peripheral end part of the screen 1 is inserted into and coupled with slot 2e through elastic member 5.

In this case, it is desirable to have one surface of the elastic member 5 fixed to the screen 1, and further, another surface thereof fixed to the framework 2 either by a sticking means or a cementing means.

A double adhesive surface tape with an adhesive coating applied on both surfaces of an elastic tape is most suitable for elastic member 5.

The thickness of elastic member 5 is about 0.5 to 1.5 mm.

When a narrow strip-like elastic member of 0.5 to 1.5 mm thick is used, a lengthwise deformation as well as a thicknesswise deformation extending over about six times as much as the thickness of the elastic member is acceptable. Therefore, when the screen is expanded or contracted according to temperature changes, the deformable elastic member can cope with the expansion or contraction of the screen. More specifically, the elastic member is deformed lengthwise in the same direction as that of the expansion or contraction of the screen, and also the elastic member is expanded or compressed thicknesswise against the lengthwise extent of expansion or contraction of said screen.

Figure 4A:
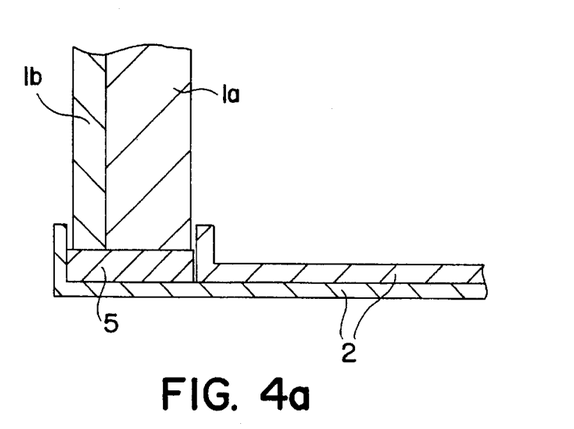
FIG. 4a is a cross-sectional view to show schematically positional relations among a screen, framework and elastic member used in a projection type television receiver presented in accordance with an exemplary embodiment of the present invention.
Figure 4B:
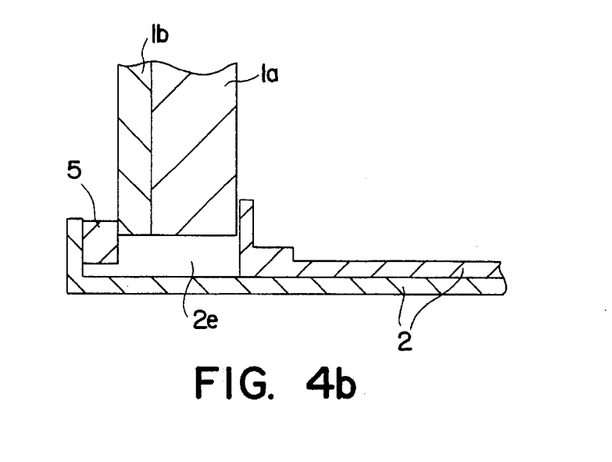
FIG. 4b is a cross-sectional view to show schematically other positional relations among a screen, framework and elastic member used in a projection type television receiver presented in accordance with an exemplary embodiment of the present invention.
Figure 4C:
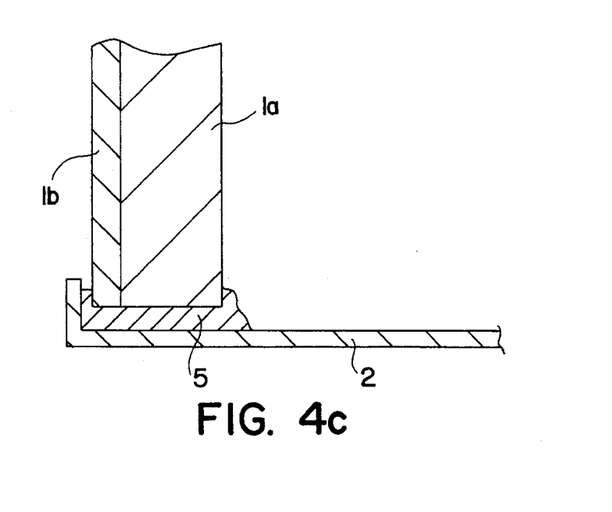
FIG. 4c is a cross-sectional view to show schematically still other positional relations among a screen, framework and elastic member used in a projection type television receiver presented in accordance with an exemplary embodiment of the present invention.

It is possible to form the structure of the joint part according to FIG. 4a, FIG. 4b or FIG. 4c.

FIG. 4a shows a structure wherein the peripheral end surface of a screen 1 is attached to a framework 2 through an elastic member 5.

The foregoing example, wherein a double adhesive surface tape is used as the elastic member, uses the same joint structure as shown in FIG. 4a.

FIG. 4b shows a structure wherein the peripheral end part of the plane of a screen 1 is stuck to a slot 2e of a framework 2 through an elastic member 5 so as to have said peripheral end part of the plane of the screen 1 and slot 2e arranged in parallel with the surface plane of the screen.

FIG. 4c shows a structure wherein the peripheral end surface of a screen 1 and peripheral end part of the plane of the screen 1 is attached to a framework 2 through an elastic member 5.

It is possible with the present example to employ a structure wherein a projection is formed only in the front part of the framework as shown in FIG. 4c in place of the recessed slot formed in the framework 2.

No restrictions are imposed on the sticking means, and a cohesive substance, adhesive substance or the like, which is made from synthetic resins and publicly known, can be used.

It is also possible with the present example to employ a fixing means in place of a sticking means by applying a mechanical pressure utilizing the elasticity of the elastic member itself.

The word "sticking" as used in the specification is defined as including "cohesion" or "ordinary adhesion".

The word "fixing" as used in the specification is defined as meaning at least one selected from "holding in place by a cohesive substance", "holding in place by an adhesive" and "holding in place by a mechanical pressure".

In an exemplary embodiment of the present invention, the elastic member 5 can be comprised of a material that is readily changed three dimensionally in configurations according to applied external force can be used. Such elastic rubber materials formed into lumps as butyl rubber, acrylic rubber, silicon rubber can be used as the elastic member 5, for example.

As other materials for the elastic member 5 can be used polyurethane foam, polyethylene foam and other plastic foam materials having many pores.

As still other materials for the elastic member 5 can be used the aforementioned elastic rubber or plastic foam, the surface of which is applied with an adhesive or cohesive material.

One of such materials is the foregoing double adhesive surface tape, for example.

The foregoing elastic rubber or plastic foam itself having adhering or cohering ability can be used as still other materials for the elastic member 5.

When the screen 1 is expanded or contracted by changes in temperature or humidity with the foregoing structure, the slot 2e, wherein the elastic member 5 is placed, can cope with the above changes by having the smallest possible depth because the screen 1 is stuck to the framework 2 through the elastic member 5 which is deformable according to the above expansion or contraction of the screen 1. Therefore, it becomes possible to make the framework width D of the framework 2 much smaller when looked from the front of the screen.

With the present example wherein the width of the screen is 500 to 900 mm, the framework width D can be made as small as about 1 to 1.7 mm.

Even with a structure having such said small framework width D, the trouble of falling of the screen 1 from the framework 2 or distortion thereof can be eliminated.

As explained in the above, the foregoing structure has made it possible to prevent effectively the screen 1 from falling off the framework 2 or from distortion because the elastic member 5 is deformed to cope with the expansion or contraction of the screen 1 when the screen 1 is expanded or contracted on account of changes in temperature or humidity and also subjected to external pressing force.

EXAMPLE 2

Figure 7:
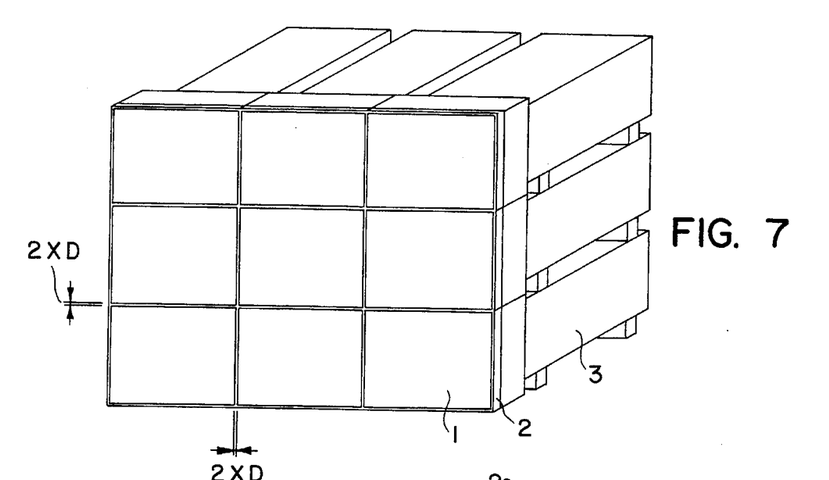
FIG. 7 shows the appearance of a large screen video display apparatus having a plurality of the projection type television receiver arranged in a matrix formation, in accordance with an exemplary embodiment of the present invention.

FIG. 7 is a perspective view of an exemplary embodiment of a multi-screen type large screen video display apparatus with a plurality of the projection type television receivers, which was explained in Example 1, arranged in a matrix formation comprised of 3 rows horizontally and 3 lines vertically, and put together for displaying one large video image.

In FIG. 7, the framework width D of one projection type television receiver forms an edge width (2×D) of the multi-screen type large screen video display apparatus, and video images are missing from the areas occupied by the edge widths.

Therefore, by incorporating projection type television receivers with small framework widths, an effective result can be expected in realizing a multiscreen type large screen video display apparatus with less missing of video images and excellent video display performance.

EXAMPLE 3

Next, another exemplary embodiment of a multiscreen type large screen video display apparatus which is built by a plurality of the projection type television receivers of Example 1 arranged in a matrix formation is be explained with the help of FIG. 2, FIG. 3a, FIG. 3b and FIG. 7.

In connection with the fitting relation between the framework 2 and the cabinet's opening 3a, the positions of the external line of the outer most periphery of the framework 2a's left side and that of the left side of the cabinet's opening 3a are arranged the same, and at the same time the positions of the external line of the outer most periphery of the framework 2b's bottom side and the external line of the bottom side of the cabinet's opening 3a are arranged the same.

Further, each respective outer most peripheral dimension of the framework's right side 2c and the framework's upper side 2d is made shorter by about 1 mm than the outer most peripheral dimension of the cabinet's opening 3a.

In FIG. 3a and FIG. 3b, the difference in the external dimension between said framework 2 and cabinet's opening 3a is indicated by symbol "A".

On account of the foregoing structure, when the screen 1 is expanded by to changes in temperature or humidity, the directions of expansion are restricted in the right side and upper side for effective prevention of any breakage or distortion caused by the neighboring screens pressing one another.

Also, FIG. 7 shows an exemplary embodiment of a multi-screen type large screen video display apparatus with the projection type television receivers arranged in a matrix formation comprised of 3 rows horizontally and 3 lines vertically.

The large screen video display apparatus thus structured is effective in facilitating alignment of the edge position and the edge width (2×D) in a straight line.

On the other hand, as shown in FIG. 3a and FIG. 3b in connection with the fitting structure of the framework and cabinet's opening, the framework's left side 2a and bottom side 2b are fitted in the recessed slot 3b formed on the end surface of the cabinet's opening 3a with a small clearance (indicated by symbol "B").

The framework's right side 2c and upper side 2d are fitted in the recessed slot 3b formed on the end surface of the cabinet as opening 3a with a large clearance (indicated by symbol "C").

More specifically, the foregoing structure is made possible by making the thickness of two neighboring sides of the framework (the left side 2a and bottom side 2b, for example) smaller than that of the other two neighboring sides (the right side 2c and upper side 2d, for example) and having these end parts of said framework with differing thickness inserted in the recessed slots of the same width formed in the cabinet's opening.

It is also possible to employ another structure wherein the width of the slots formed in the two neighboring sides of the cabinet (the opening's left side and bottom side, for example) is made larger than that of the slots formed in the other two neighboring sides (the opening's right side and upper side) and having a framework, wherein the end parts of its four sides are made the same in width, inserted in the foregoing slots with differing width.

On account of the foregoing structure, it has been made easy, in connection with the positional relation between the framework 2 and the cabinet 3, to put the framework and cabinet together by having the external line position of the outer periphery of the framework's left side 2a and bottom side 2b and that of the left side and bottom side of the cabinet's opening 3a arranged to be in the same plane.

As a result, with the multi-screen type large screen video display apparatus as shown in FIG. 7, it is expected to produce an effect in facilitating alignment of the edge positions and the edge width in a straight line. Further, it is effective in controlling the edge positions even when the framework presents contraction or expansion in dimension and some dimensional scattering caused by its fabrication process.

EXAMPLE 4

Next, another exemplary embodiment of the projection type television receiver disclosed by the present invention will be explained.

Figure 5A:
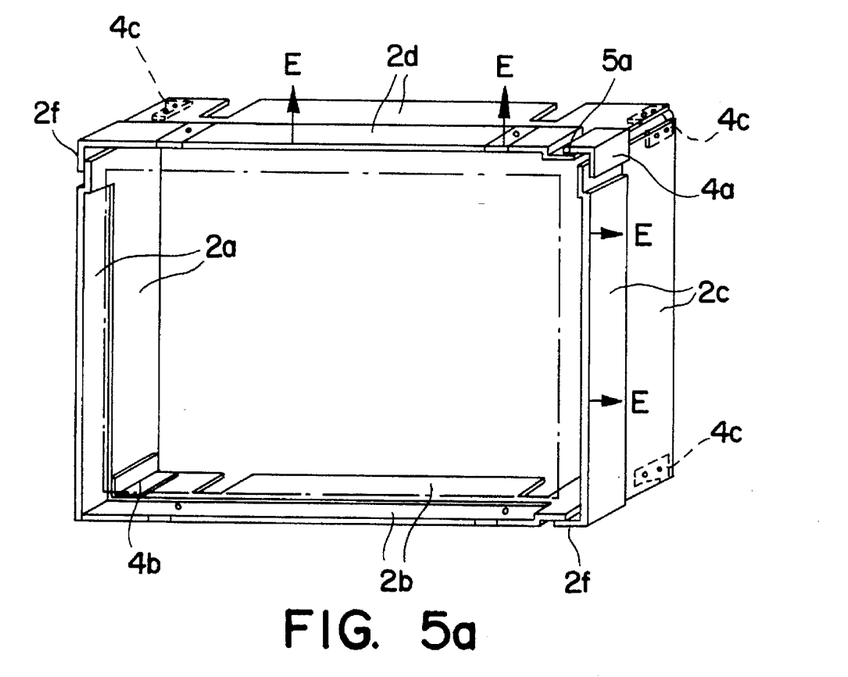
FIG. 5a is a perspective view to illustrate details of a framework used in a projection type television receiver presented as an exemplary embodiment of the present invention.

FIG. 5a shows the structure of an exemplary embodiment of the framework used in the projection type television receiver of Example 1.

Figure 5B:
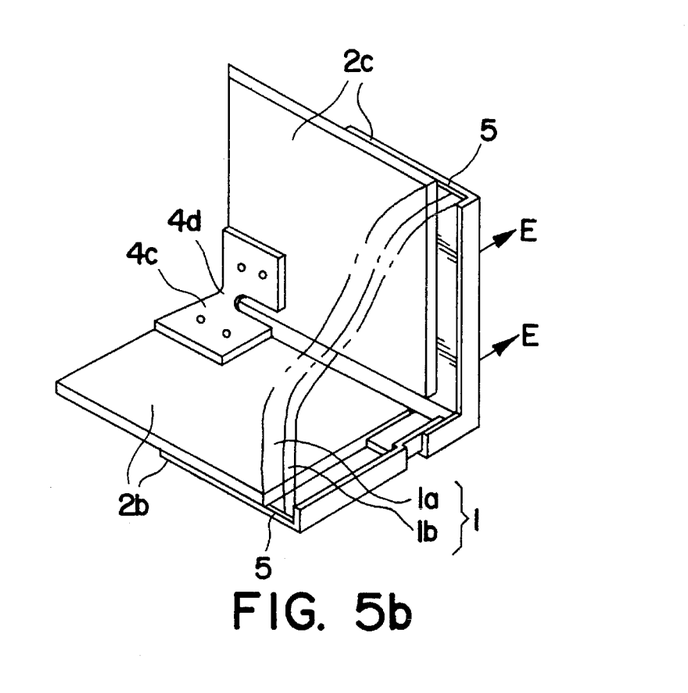

FIG. 5b is an expanded view of a main portion of the framework illustrated in FIG. 5a.

Figure 5C:
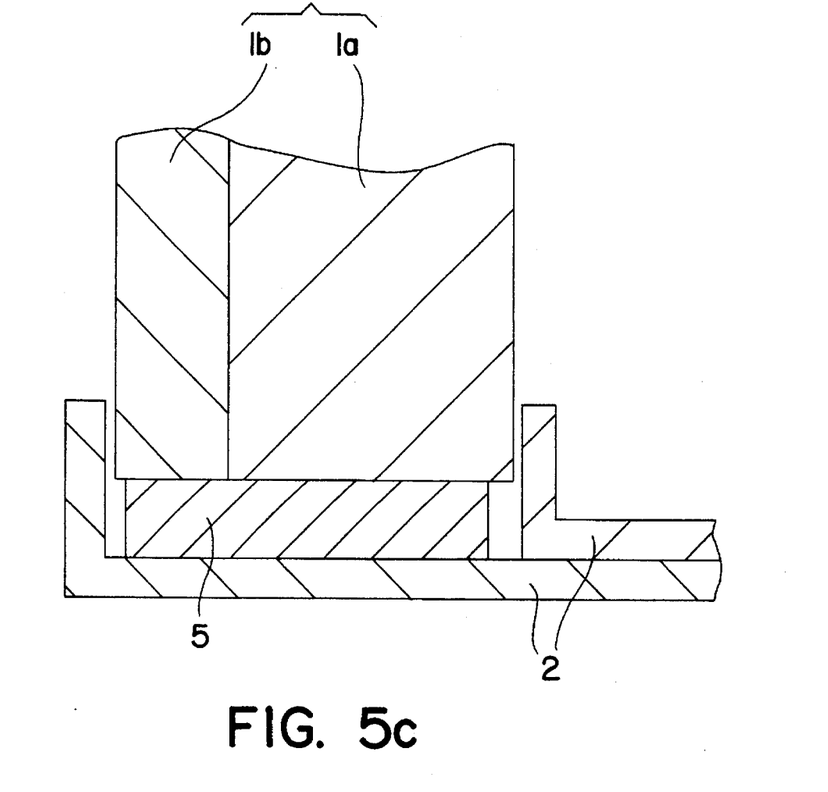

FIG. 5c is an enlarged detail to illustrate schematically the holding structure of the framework and screen shown in FIG. 5a.

In FIG. 5a, the left side 2a and bottom side 2b of the framework are fixed with each other on the inside thereof by means of an undeformable L-shaped corner joint.

The undeformable L-shaped corner joint serves the purpose of keeping the framework's configuration in a quadrangle.

In order to prevent light from leaking due to expansion or contraction of the frameworks a folding part 2f is formed on the end of the framework's upper side 2d and right side 2c, respectively.

The framework's right side 2c and upper side 2d are fixed with each other on the inside thereof at a position apart from the frameworks slot 2e, which holds the screen 1, by means of a deformable L-shaped corner joint 4c.

As shown in FIG. 5b, the frameworks bottom side 2b and right side 2c are fixed with each other on the inside thereof at a position apart from the framework's slot 2e, which holds the screen 1, by means of the deformable L-shaped corner joint 4c.

The framework's left side 2a and upper side 2d are likewise fixed with each other by means of the deformable L-shaped corner joint 4c.

Further, the framework's right side 2c and upper side 2d are joined each other on the outside thereof by means of a corner joint 4a having in between an elastic sheet 5a which is deformed readily according to applied external force.

The purpose of using the elastic sheet 5a is twofold, one being to absorb the deformation stress caused by expansion or contraction of the screen 1 and the other being to prevent the projected light inside the cabinet from leaking outside when the screen is expanded.

The corner joint 4a is stuck in place so as to move together with said elastic sheet 5a.

Any materials that can be deformed according to expansion or contraction of the screen 1 can be used as the elastic sheet 5a.

A material similar to the elastic member 5 as described in Example 1, for example, can be used.

No particular restrictions are imposed on the deformable L-shaped corner joint 4c, but such metallic materials such as iron, aluminum, stainless steel or the like are usually used.

Besides, as shown in FIG. 5b, a cut is formed at the corner 4d of the L-shaped corner joint 4c.

The cut corner facilitates deformation of the joint according to applied external force.

No particular restrictions are imposed on the configuration of said corner cut, and a U-shaped or V-shaped cut, for example, can be used.

Further, as the materials of the deformable L-shaped corner joint 4c can be used synthetic resin materials or fabrics which are deformable at the corner portion of an L-shape formed thereof in addition to the foregoing metallic materials.

There are no restrictions imposed on the material of the framework 2, and any materials that are mechanically strong enough to sustain the structure can be used. As shown in FIG. 5c, an iron sheet, for example, can be used. In that case, use of an iron sheet of about 0.2 mm thick may be a possibility.

In order to form a recessed slot 2e, it is also possible to employ a structure wherein another iron sheet or a reinforced plastic material is laminated on the foregoing iron sheen.

Figure 5D:
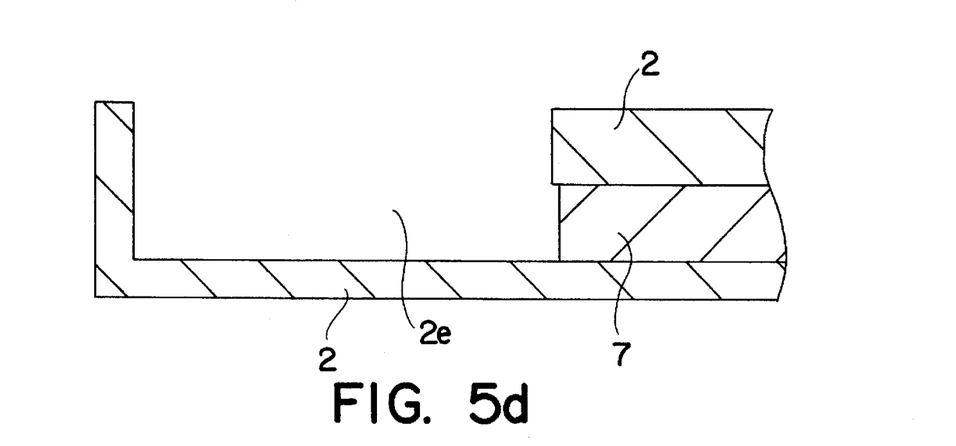

No particular restrictions are imposed on the method of lamination to form the slot, and there is a method of fastening together by an adhesive 7 as shown in FIG. 5d, for example, or a method of joining together by bolts and nuts. Particularly, as the adhesive it is desirable to use one that has elasticity to deform according to applied external force.

When the two framework materials to be joined have different thermal expansion coefficients, the difference in expansion or contraction can be absorbed by proportionate deformation of said adhesive, and the deformation of the framework can be effectively prevented from taking place.

The peripheral portions of the screen 1 are cemented inside the slot 2e through the elastic member 5.

It is desirable to use a double adhesive surface tape of about 0.4 mm thick as the elastic material.

Thus, it has become possible to make the width D of the framework viewed from the front as narrow as about 0.9 mm, as shown in FIG. 5c.

On account of the foregoing structure, even when the screen 1 is expanded or contracted rather greatly due to larger changes in temperature or humidity, the elastic double adhesive surface tape 5 will be deformed in the longitudinal direction to cope with the expansion or contraction of the screen 1 as far as the same direction as the expansion or contraction of the screen 1 is concerned. At the same time, the narrowed bent portion 4d of the deformable L-shaped corner joint 4c is deformed at three different places in following up the thrusting or pulling force created according to the expansion or contraction of the screen 1.

Therefore, the vicinity of the slot where the screen is supported by the framework's right side 2c and upper side 2d is warped in the direction indicated by an arrow E as shown in FIG. 5a and FIG. 5b with the bent portion 4d serving as the fulcrum.

As a result, such troubles as distortion and breakage of the screen are eliminated.

As shown in FIG. 7, a large screen video display apparatus formed by arranging in a matrix formation the projection type television receivers each having a structure, wherein the framework holding the aforementioned screen is employed, presents extremely small edge width, resulting in an effective reduction of the missing regions of the video image.

EXAMPLE 5

Next, still another exemplary embodiment of the projection type television receiver disclosed by the present invention will be explained.

Figure 6A:
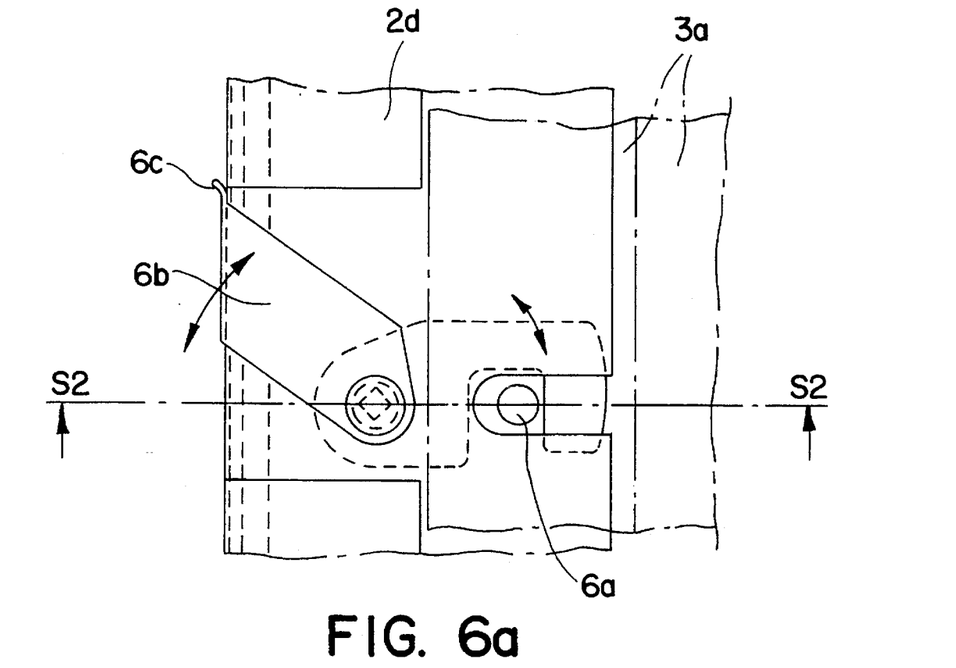
FIG. 6a is a plan view of an important part showing assembly structures of a framework and cabinet of a projection type television receiver presented in accordance with an exemplary embodiment of the present invention.

FIG. 6a is a plan view of the important part showing assembly structures of the framework and cabinet of the projection type television receiver as explained in Example 1. More specifically, it is an enlarged detail of the framework's upper side.

Figure 6B:
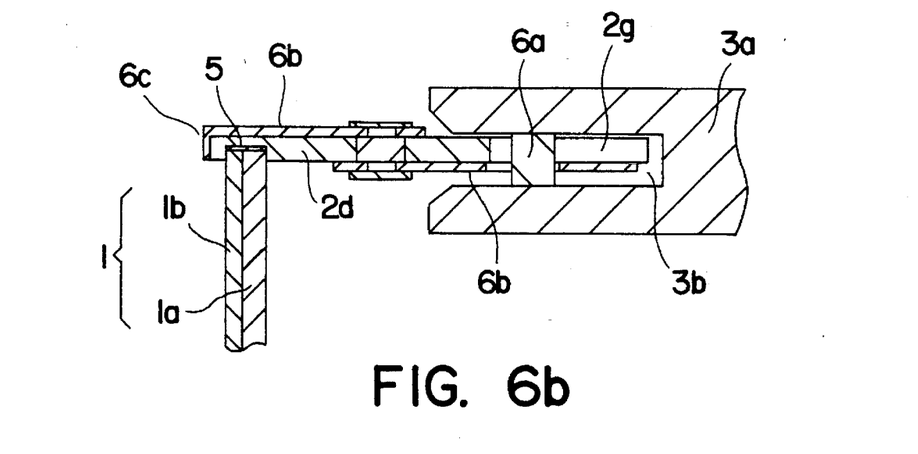
FIG. 6b is a cross-sectional view of FIG. 6a cut along the line 6b—6b.

FIG. 6b is a cross-sectional view of FIG. 6a cut along the line 6b—6b.

As shown in FIG. 6a and FIG. 6b, the engagement between the framework 2 and the cabinet's opening 3a is performed by having a projection 2g formed on one end of the framework 2 inserted in a recessed slot 3b formed on the end surface of the cabinet's opening 3a.

A lock pin 6a is disposed in the recessed slot 3b, and a hook like lock lever 6b is disposed at a specified place of the projection 2g of the framework 2.

After the projection 2g of the framework 2 is inserted in and engaged with the slot 3b of the cabinet's opening, the hook like lock lever 6b is engaged with the lock pin 6a for fastening.

The lock lever 6b is small and measures about 0.5 mm thick, and occupies an extremely small place for installation. It is made of such metallic materials as iron, aluminum and the like by specified means of a pressing process or bending process.

A bent member 6c is formed on the end part of the lock lever, and said bent member 6c hits the end surface of the framework's upper side 2d which serves as a stroke end.

The lock mechanism thus structured is installed at one position at least of all the sides of the framework and cabinet's opening, respectively. It is desirable to have the aforementioned position of the lock mechanism located at the place where a clearance to the cabinet's slot 3b exists.

With a large screen video display apparatus which is constructed by stacking in a matrix formation a plurality of projection type television receivers equipped with the foregoing frameworks for holding screens as shown in FIG. 7, it is possible to readily take off a screen. This is accomplished by pulling it out towards the front. This is accomplished by unlocking the lock lever 6b by rotating it towards the front. This can even be done when the screen is located in the middle of the large screen.

Thus, maintenance operations such as repairs, inspection or the like involving screens can be made effectively easier.

There are other variations in the exemplary embodiments of the present invention than the examples described in the foregoing.

For example, as the elastic material, can be a different material that is deformable in three different directions can be used.

Also, it is possible to employ a structure wherein the elastic material is disposed discontinuously between the screen and the framework.

A protective panel can be additionally placed in front of a regular screen formed of a lenticular lens sheet and Fresnel lens sheet.

A screen need not be formed of a lenticular lens sheet and Fresnel lens sheet. Any materials can be used as long as the materials have a screening effect.

The four sides of a framework can also be made of one solid body by integrated molding of a resin material.

The method of forming a recessed slot of a framework can also be accomplished by making a single body instead of by plate lamination.

In place of a slot made in a recessed structure on the framework, it is also possible to adopt a projected structure formed only on the front surface of the framework.

In connection with the way of fixing a framework which holds a screen to a cabinet, the design need not be limited to a structure wherein a lock lever and a lock pin are used. Rather, other lock mechanisms can be employed.

Therefore, any exemplary embodiments derived from the present invention are covered by what is claimed by the present invention as long as such said embodiments abide by the true spirit and scope of the present invention.

What is claimed:

1. A multi-screen type large screen video display apparatus including a plurality of a projection type television receivers arranged in multiple rows and columns for the purpose of displaying a large screen video image, each one of said plurality of projection type television receivers comprising:

a permeable screen;

a framework for holding said permeable screen;

an elastic member between said permeable screen and said framework, said elastic member readily deformable according to expansion or contraction of said permeable screen, wherein said elastic member includes an attaching material, and a circumference of said permeable screen and said framework are attached to said elastic member by said attaching material, a cabinet having an opening wherein said framework is installed, wherein a recessed slot is formed on a front surface of said opening of said cabinet and one end of said framework is placed inside said recessed slot, said framework being removably and moveably mounted in said opening, said framework and said opening in said cabinet having four sides, and a clearance between two adjacent sides of said framework and said recessed slot is larger than a clearance between the other two adjacent sides of said framework and said recessed slot, and means for coupling each one of said plurality of television receivers to another one of said plurality of television receivers to form said multi-screen type large screen video display apparatus.

2. The multi-screen type large screen video display apparatus according to claim 1, wherein the thickness of two of said side surfaces of said framework is smaller than the thickness of two other of said side surfaces of said framework, and said side surfaces are inserted in said slots formed in said cabinet.

3. The multi-screen type large screen video display apparatus according to claim 1, wherein the width of two of said plurality of slots formed in said cabinet is larger than the width of two other of said plurality of slots formed in said cabinet and end parts of the framework are inserted into said plurality of slots.

4. A multi-screen type large screen video display apparatus including a plurality of a projection type television receivers arranged in multiple rows and columns for the purpose of displaying a large screen video image, each one of said plurality of protection type television receivers comprising:

a permeable screen;

a framework for holding said permeable screen;

an elastic member between said permeable screen and said framework, said elastic member readily deformable according to expansion or contraction of said permeable screen, wherein said elastic member includes an attaching material, and a circumference of said permeable screen and said framework are attached to said elastic member by said attaching material, a cabinet having an opening wherein said framework is installed, wherein a recessed slot is formed on a front surface of said opening of said cabinet and one end of said framework is placed inside said recessed slot, said framework being removably and moveably mounted in said opening, and means for coupling each one of said plurality of television receivers to another one of said plurality of television receivers to form said multi-screen type large screen video display apparatus;

wherein a hook-shaped lock lever rotatable away from said permeable screen is installed on the outside of said framework, a lock pin is formed in a recessed pan of said cabinet, and said lock pin and said lock lever are coupled with each other for fastening said framework to said cabinet, when said lock lever is rotated away from said permeable screen, said framework is not fastened to said cabinet.

5. A projection type television receiver comprising:

a rectangular permeable screen;

a rectangular framework wherein two neighboring side members are joined with each other by means of an L-shaped deformable corner joint at three different corners, and two neighboring side members at the remaining corner are joined with each other by means of an L-shaped undeformable corner joint;

an elastic member which is attached between said permeable screen and said framework, said elastic member readily deformable according to applied external force; and a cabinet having an opening wherein said framework is installed, wherein said rectangular framework and said elastic member are deformable to allow for the expansion of said screen.

6. The projection type television receiver according to claim 5, wherein said deformable L-shaped corner joint is formed of a metallic material, and a cut is formed in said deformable L-shaped corner joint for easier deformation at said corner.

7. The projection type television receiver according to claim 5, wherein an elastic sheet is provided and two neighboring side members are joined with each other through said elastic sheet by means of said L-shaped deformable corner joint at three different corners of said framework, wherein said elastic sheet prevents light inside the cabinet from escaping outside said cabinet.

8. The projection type television receiver according to claim 5 arranged with a plurality of further projection type television receivers in a matrix formation of multiple rows and lines and assembled for the purpose of displaying a large screen video image.

* * * * *

UNITED STATES PATENT AND TRADE MARK OFFICE
CERTIFICATE OF CORRECTION

PATENT NO.   : 5,548,350
DATED        : August 20, 1996
INVENTOR(S)  : Yamada et al.

It is certified that error appears in the above-identified patent and that said Letters Patent is hereby corrected as shown below:

On the Cover Page, in the Abstract, item [57], lines 6-7, delete the phrase ", and which is excellent in maintainability".

Column 13, line 3, delete "pan" and insert therefor --part--.

Signed and Sealed this

Twenty-fifth Day of February, 1997

*Attest:*

BRUCE LEHMAN

*Attesting Officer*                    *Commissioner of Patents and Trademarks*